United States Patent

Waller

[15] 3,704,853
[45] Dec. 5, 1972

[54] VALVE WITH DIFFERENTIAL CLUTCHING VALVE ACTUATOR

[72] Inventor: Henry A. Waller, Los Angeles, Calif.

[73] Assignee: Consolidated Controls Corporation, Bethel, Conn.

[22] Filed: March 26, 1971

[21] Appl. No.: 128,466

[52] U.S. Cl. ............251/59, 74/424.8 VA, 192/18 B, 251/136
[51] Int. Cl.......F16d 13/42, F16d 67/04, F16k 31/00
[58] Field of Search....................251/59, 81, 79, 136; 74/424.8 VA, 424.8 R; 192/18 A, 18 B, 18 R

[56] References Cited

UNITED STATES PATENTS

| | | | |
|---|---|---|---|
| 1,908,763 | 5/1933 | Kelty | 251/81 X |
| 2,180,287 | 11/1939 | Zwack | 192/18 B |
| 3,343,427 | 9/1967 | Silvestri | 74/424.8 R |
| 3,430,524 | 3/1969 | Thomas | 192/18 R |

*Primary Examiner*—Arnold Rosenthal
*Attorney*—Mason, Kolehmainen, Rathburn & Wyss

[57] ABSTRACT

A valve including a body having a seat cooperating with a valve closure member and an actuator mechanism comprising an elongated valve stem connected to the closure member and having a threaded portion intermediate its ends. Differential clutch means is associated with the valve stem for rotation therewith and/or relative slidable displacement along the length of the stem. A drive nut is rotatably driven and mounted on the valve body for engagement with the threaded portion of the stem and means is provided for rotating the drive nut. A clutch mechanism selectively interconnects the nut and the differential clutch member whereby engagement of the clutch causes rotation of the stem in response to rotation of the drive nut. A brake mechanism selectively interconnects the valve body and the differential clutch member and is operative when engaged to restrain rotation of the valve stem so that the drive nut produces longitudinal movement of the stem to open or close the valve.

10 Claims, 2 Drawing Figures

PATENTED DEC 5 1972
3,704,853
FIG. 1
FIG. 2
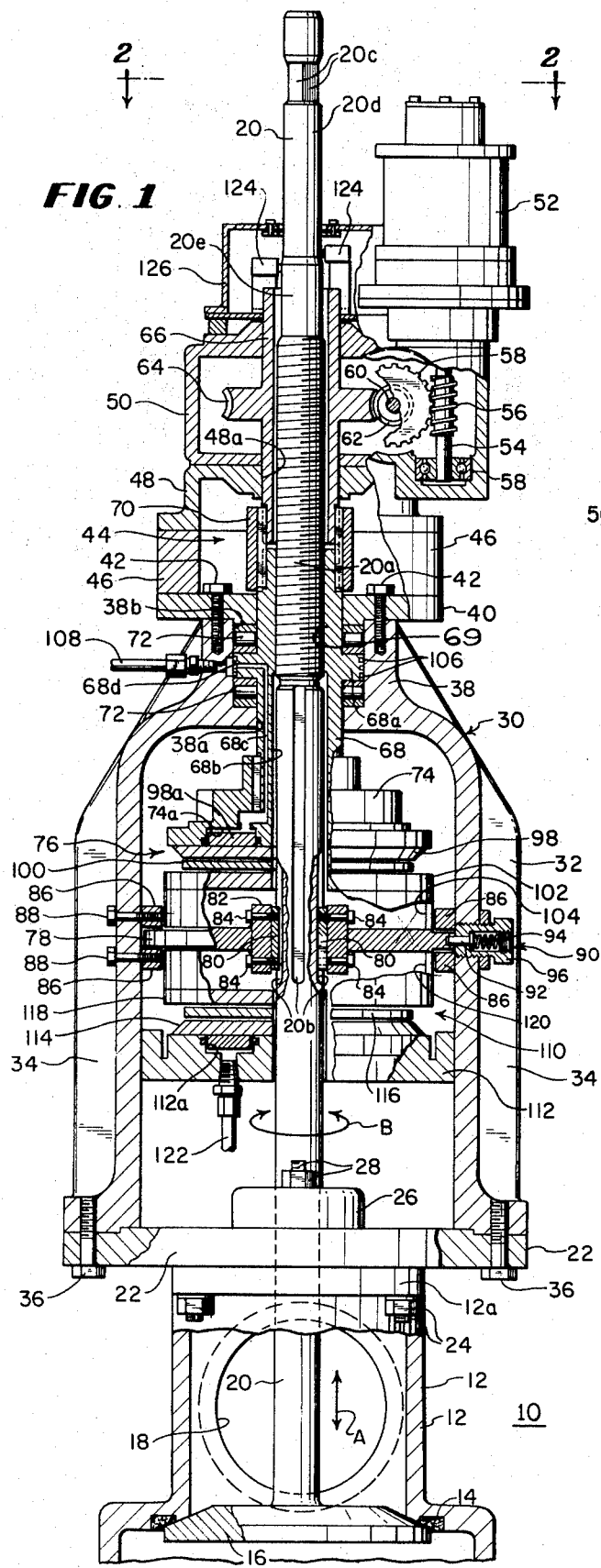
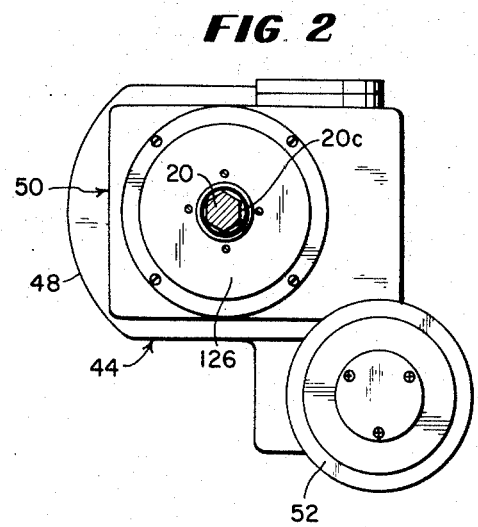
INVENTOR:
HENRY A. WALLER
BY Mason, Kolehmainen
Rathburn & Wyss
ATTORNEYS

VALVE WITH DIFFERENTIAL CLUTCHING VALVE ACTUATOR

The present invention relates to valves and, more particularly, is directed to a novel valve construction including a differential clutching valve actuator which can be operated to rotate the valve stem and/or longitudinally displace the stem, at selectively controllable rates to open and close the valve. In many commercial applications a slurry or thick fluid mixture is moved through pipe line systems having control valves therein under high pressures and at high flow rates. It is frequently necessary to provide control valves for such applications which can be easily and rapidly opened or closed. Moreover, the valves should provide a nonleaking, tight seal when closed even though the material involved has a tendency to form hard deposits on the valve seats and closure members.

An object of the present invention is to provide a new and improved heavy duty valve having an actuator which is selectively controllable to operate as a rotational stem valve and/or a longitudinally movable stem valve.

Another object of the present invention is to provide a valve of the character described wherein the rate of stem rotation and/or longitudinal stem translation is selectively controllable and may be varied in either instance from zero to a maximum rate and, further, can be set and maintained at any desired rate value selected.

Another object of the present invention is to provide a new and improved valve of the character described wherein a valve closure member carried on the valve stem may be rapidly moved by longitudinal displacement of the stem with little or no rotation thereof from an open position to a nearly closed position and thereafter slowly moved in longitudinal translation while rotated at a selected rate to effect grinding action between the valve and valve seat as the valve seats in a closed condition.

Another of the present invention is to provide a new and improved valve actuator of the character described having new and improved means for effecting precise selection of the control and speed of longitudinal translation of the stem as well as precise control of the speed and direction of rotation of the stem as the valve is being opened or closed.

Still another object of the present invention is to provide a new and improved differential clutching valve actuator with means for effectively controlling the rate of closure or opening and rate of rotation of the stem during closing or opening of the valve.

Briefly, the foregoing and other objects and advantages of the present invention are accomplished in an illustrated embodiment which includes an actuator mechanism for controlling the movement of a valve closure toward and away from a valve seat on the valve body. The actuator mechanism includes an elongated valve stem supporting the valve closure member for movement to open and close the valve. A differential clutch member is mounted on the valve stem for rotation therewith and/or relative slidable translation and a drive nut is rotatably mounted on the valve body in engagement with a threaded portion on the stem. Power means is provided for rotating the drive nut and a clutch mechanism is provided to selectively interconnect the drive nut and the differential clutch member so that engagement of the clutch drivingly interconnects the stem to rotate with the drive nut. The brake mechanism interconnects the valve body and the differential clutch member on the stem, and when energized, is effective to restrain rotation of the stem so that the rotating drive nut produces longitudinal translation of the stem rather than rotation. The stem can be selectively controlled by restraint against rotation and driven only in a longitudinal direction, or can be restrained in the longitudinal direction and only rotated. Control is selective so the stem may be moved at varying selectively controlled rates of rotation and/or longitudinal translation.

For a better understanding of the invention, reference should be had to the following detailed description when taken in conjunction with the drawings, in which:

FIG. 1 is a longitudinal sectional view of a valve constructed in accordance with the features of the present invention; and FIG. 2 is an end elevational view looking in the direction of the arrows 2—2 of FIG. 1.

Referring now, more particularly, to the drawings, therein is illustrated a new and improved valve, indicated generally by the reference numeral 10, which valve is particularly well suited for use in selectively controlling the flow at high pressures of various fluids, such as alumina slurries and the like, which fluids have a tendency to form hard deposits on valve seats, which deposits oftentimes prevent tight sealing of the valve upon closing thereof.

The valve 10 includes a body 12 having an annular seat or ring 14 defined therein which cooperates with a valve member 16 to open and close for controlling fluid passage between a lower end portion of the valve body and a port 18 above the seat ring 14. The valve member 16 is mounted adjacent the lower end of an elongated valve stem 20 and is connected thereto in a manner similar to the arrangement shown in U. S. Pat. No. 2,996,075, wherein the valve member may be tilted angularly with respect to the stem within a limited range to effect a tight seating on the seat ring 14, but is positively restrained from rotation relative to the stem. The elongated stem 20 extends upwardly through an opening in the upper end wall in the valve body 12 and through an axially aligned opening formed in the center of an enlarged baseplate 22. Baseplate 22 is attached to the upper end wall of the valve body 12 by suitable bolt and nut assemblies 24 and a sealing gland 26 is provided on the upper surface of the baseplate 22 held in place with bolt and nut assemblies 28 to seal around the valve stem while permitting free longitudinal sliding translation and rotation of the stem relative to the valve body and baseplate.

As indicated by the arrow "A," the valve stem 20 is movable in longitudinal translation to open and close the valve 16 with respect to the seat ring 14 and, in addition, the valve stem 20 is rotatable about its longitudinal axis in opposite directions as indicated by the arrow "B." By precisely controlling the rate and direction of the translational movement of the stem, as indicated by the arrow "A," and the rotational movement of the stem, as indicated by the arrow "B," the exact type of opening or closing action desired for particular fluid or slurry can be achieved; for example, the valve stem may be moved rapidly downward without rotation in order to rapidly open the valve. The valve may be closed by rapid upward movement of the stem without rotation until the valve 16 is only a short distance from the seating ring 14 at which time rotational movement is imparted to the valve as it seats tightly against the seat ring 14. Similarly, in opening or closing the valve, rotational movement may be used in combination with longitudinal translation, or the valve may be rotated on the seat without longitudinal translation of the stem to effect a grinding of the seat and valve.

In accordance with the present invention, the valve 10 includes a valve actuator mechanism generally indicated by the numeral 30 and mounted on the baseplate 22. The actuator 30 is adapted to move and control the valve stem 20 as described and includes a yoke 32 having a pair of upstanding side legs 34 disposed on opposite sides of the stem and parallel thereto. The legs 34 are secured at their lower ends to the baseplate 22 by cap screws 36 and are integrally interconnected adjacent the upper ends by a bight portion 38. The bight portion 38 is formed with a cylindrical bore 38a therein in coaxial alignment with the valve stem 20, and the upper portion of the bore is enlarged as at 38b to form a bearing chamber which is covered at the upper end by an annular closure plate 40 held in place by a plurality of cap screws 42. The closure plate 40 provides a base for an annular coupling chamber 44 defined by a cylindrical sidewall 46 and an upper end closure plate 48 having a cylindrical shaft opening 48a formed in the upper end in coaxial alignment with the stem. The upper end wall 48 serves as a base to support a gear box housing 50 on which is mounted a drive motor 52. The motor 52 may be fluid driven or electrical and rotates a shaft 54 having a worm 56 thereon. The motor shaft 54 is parallel to the valve stem 20 projecting downwardly from the motor casing into the gear box housing 50 and is supported in a lower bearing 58 at the lower end. The worm 56 drivingly engages a gear 58 which is mounted on a shaft 60 extending in a direction transversely of the stem 20 and shaft 54 and spaced between the two. A worm 62 is mounted on the shaft 60 for engagement with a gear 64 rotatable coaxially of the valve stem 20. The gear 64 is mounted on or integral with a hollow drive sleeve 66 which is supported for rotation at its upper and lower end portions in the end walls of the gear housing 50. The lower end of the sleeve projects downwardly through the wall aperture 48a into the coupling chamber 44.

The sleeve 66 is in coaxial alignment around the valve stem 20 but does not drivingly engage the stem, and the motor 52 may be rotated in opposite directions to rotate the sleeve in either direction at relatively low speeds because of the substantial gear reduction provided by the worm gear combinations.

The lower end of the sleeve 66 is drivingly coupled to the upper end of a drive nut sleeve 68 by a coupling unit 70 which is mounted in the coupling chamber 44. The drive nut sleeve 68 is in coaxial alignment around the stem 20 and is threaded internally to threadedly engage a threaded portion 20a formed on the stem intermediate its ends. The drive nut 68 is provided with an outwardly extending annular ridge 68a spaced between its opposite ends and the ridge is seated in the enlarged bearing recess or chamber 38b formed in the bight portion of the yoke. The ridge 68a is disposed between a pair of bearing rings 72, which support the drive nut for rotation in the yoke structure. The lower end portion of the internal bore of the drive nut 68 is enlarged, as at 68b, to permit free movement of the valve stem relative thereto, and only an upper end portion of the drive nut sleeve is internally threaded as at 69 for threaded engagement with the threaded portion 20a of the valve stem. An annular drive mechanism 74 of a differential clutch assembly 76 is mounted on the lower end portion of the drive nut sleeve to rotate therewith. The clutch assembly 76 may be mechanically, hydraulically, or electrically operated and provides for selectively controlled differential clutching between the rotating drive nut sleeve 68 and an annular differential clutch member 78 which is in keyed engagement on the valve stem 70. The clutch member 78 is provided with a plurality of vertically extending key members 80 carried on the inner bore surface of a vertical sleeve 82 and held in place with the cap screws 84. The keys 80 are slidably engaged in longitudinally extending keyways or grooves 20b formed in the valve stem beneath the threaded portion 20a. The differential clutch member 78 is supported on the yoke 32 between a pair of annular rings 86 carried by the yoke legs 34 and attached thereto by cap screws 88. The differential clutch disc 78 may rotate freely relative to the yoke or may be locked to the legs against relative rotation by means of a lockpin assembly 90 which includes a locking pin member 92 biased inwardly by a spring 94. The spring is mounted in a capped sleeve 96 which is seated in a threaded bore provided in one or more of the yoke legs 34. The locking pin has a projecting stem portion which is adapted to seat in one or more recesses drilled in the edge of the differential clutch disc 78 around the outer circumference thereof. The locking pin assembly 90 is removable from the yoke when it is not desired to lock the clutch disc 78 thereto.

The clutch assembly 76 includes a movable pressure plate 98 having a lower face frictionally engageable with an annular clutch disc 100 formed of suitable friction material. The disc 100 in turn is adapted to engage the upper surface of an annular driven clutch disc 102 which is secured to the lockable differential clutch disc 78 by a cylindrical support wall 104. The movable pressure plate 98 comprises an annular disc having an annular piston ring 98a of smaller diameter on the upper side thereof. The piston ring is seated within an annular groove 74a which forms a fluid piston chamber for exerting downward pressure to force the pressure plate 98 into driving contact against the clutch disc 100, thereby to drive the clutch plate 102. In order to selectively control the pressure plate 98, fluid is directed into or out of the piston chamber 74a via a longitudinal passage 68c formed in the drive nut sleeve. The passage terminates in a radially outwardly extending upper end portion drilled in the annular ridge 68a so that the outer end is spaced between a pair of sealing O-rings 106. The fluid passage 68c is in communication with an annular feed groove 68d formed in the annular ridge 68a so that fluid directed into the groove may flow freely into the passage 68c and pressure chamber 74a to bias the pressure plate 98 into clutching engagement against the clutch disc 100 and thereby drive the clutch drive disc 78. Fluid is supplied via an external fluid supply line 108 which is in communication with the feed groove 68d in the annular ridge in the drive nut sleeve 68.

When the lock pin 90 is removed from the yoke legs 34, the differential clutch disc 78 is free to rotate between the supporting rings 86, and when the disc rotates, it drives the valve stem 20 to rotate in either direction while permitting longitudinal sliding translation of the stem. When the drive motor 52 is energized to rotate the drive nut sleeve 68 and the clutching assembly 76 is energized, fluid pressure biases the pressure plate 98 downwardly against the clutch disc 100 in contact with the driven disc 102, rotating the same, and consequently rotating the valve stem through the unlocked differential latch disc 78. The amount of fluid pressure can be closely regulated to permit slippage between the pressure plate 98 and the driven disc 102 in any desired amount. When pressure is supplied to the fluid clutch assembly 76 and the clutch drive member 78 is driven at the same speed as the drive nut 68, the valve stem 20 is similarly rotated in the driven direction at the same speed. If desired, by means of controlled clutch slippage in the clutch assembly 76, the stem 20 may be driven to rotate at a speed less than the drive nut 68. When this occurs, because of the threaded engagement between the threaded portion 20a of the stem and the internal threaded portion of the drive sleeve, longitudinal translation of the stem also takes place. If the differential clutch drive disc 78 is locked against rotation by engagement of the locking pin assembly 90, as previously described, a maximum rotational speed differential exists between the drive nut sleeve 68 and the valve stem and, accordingly, a maximum rate of longitudinal translation of the stem occurs, either up or down, depending on the direction in which the drive nut sleeve 68 is driven by the motor.

In order to provide for better control of the valve stem 20 so that the amount of rotational torque applied to the stem, as well as the rate of longitudinal translation thereof, can be selected and effectively controlled, the valve actuator 30 includes a differential brake mechanism, generally indicated as 110, which is similar in operation to the clutch mechanism 76. The brake mechanism 110 includes a base member 112 which is rigidly secured to the yoke legs 34 and an annular recess 112a is formed in the upper surface thereof to provide a piston chamber for actuating a pressure plate 114 upwardly against an annular clutch disc 116 formed of suitable friction material. The clutch disc 116 is adapted to engage the lower surface of a driven disc member 118 which is secured to the differential clutch disc 78 by means of a cylindrical wall 120. By means of the brake mechanism 110, the differential clutch disc 78 which is keyed to the stem 20, may be selectively restrained against rotation to any desired extent. When maximum pressure is supplied to the clutch through an external fluid pressure line 122, the differential clutch disc 78 may be effectively locked to the yoke in an action similar to engaging the locking pin assembly 90. However, when controlled, lower pressures are applied to the brake mechanism 110 slippage occurs and controlled rotation of the differential clutch disc 78 is provided. When this occurs, a difference in rotational speeds between the drive nut sleeve 68 and the stem 20 takes place, and this difference results in a longitudinal translation of the stem (arrow "A") at a controlled rate because of the threaded engagement between the stem and the drive nut sleeve. By controlling the fluid pressure in the clutch and brake supply lines 108 and 122, respectively, a precisely controlled rate (arrow "B") of rotational and/or longitudinal translation (arrow "A") of movement of the valve stem 20 is achieved. It is to be understood that electrically operated clutch and brake mechanisms or mechanical clutch and brake mechanisms could be substituted instead of the fluid clutch and brake assemblies 76 and 110 illustrated. The clutch mechanism 76 controls the torque differential between the drive nut 68 and the stem and the brake mechanism 110 controls the torque differential between the stem and the yoke 32 or valve body. By varying and balancing these torques which act on the differential clutch disc 78, precise control of the valve stem is achieved.

In operating the valve 10, if it is desired to rapidly open the valve from the closed position, as shown in FIG. 1, the drive motor 52 is energized in the proper direction at a selected speed and maximum fluid pressure is introduced to the lower braking assembly 110 to lock the stem against rotation. When this occurs, the greatest difference in rotational speed between the drive nut sleeve 68 and the stem is available, and consequently the stem 20 moves rapidly downward with maximum speed without rotation until the desired open position is attained. Similarly, if the valve is then to be closed, the direction of rotation of the motor drive 52 is reversed and a maximum pressure is maintained in the brake mechanism 110 so that the stem moves rapidly upwardly toward the closed position. As the upper surface of the valve member 16 approaches the seat ring 14, however, it may be desirable to effect rotation of the valve member to provide a self-grinding seating action to insure against leakage. To accomplish this, the fluid pressure supplied to the lower brake mechanism 110 is reduced to permit slippage and consequent rotation of the stem as fluid pressure is introduced to the upper clutch assembly 76. This action permits rotation of the stem 20 relative to the yoke and valve body and thereby reduces the difference in rotational speed between the stem 20 and the drive nut sleeve 68. A reduced speed of translation (arrow "A") results as the valve member 16 moves toward a closed position and starts to engage the seat ring 14. Resistance to longitudinal translation of the stem 20 increases to a maximum as seating occurs and the torque applied through the upper clutch mechanism 76 increases to rotate the valve stem at increasing rates. This rotation provides a self-grinding, seating action of the valve and seat, and when fully seated, the fluid pressure in the upper clutch 76 is then reduced leaving the valve fully seated in a closed position and the motor rotation is then stopped.

Provision is also made for manual opening and closing of the valve, and to this end the upper end of the valve stem 20 is provided with a plurality of flatted surfaces 20c arranged in hexagonal fashion, as shown in FIG. 2, so that a wrench or handwheel may be connected. Because of the worm gear drive arrangement between the motor 52 and the drive nut sleeve 68, when the motor is not operating the sleeve is retained against rotation by the high reduction gear ratio of the worm gear drives. Turning of the stem in the sleeve by a handwheel or wrench applied to the flatted surfaces 20c can be effected to open or close the valve member 60 against the seat ring 14. Beneath the flatted surfaces 20c, the valve stem 20 is provided with different diameter portions 20d and 20e, respectively, and these are effective to cooperate with a pair of limit switches 124 which can be wired to control the application of fluid to the clutch and brake mechanisms 76 and 110 and for controlling the motor 52. The limit switches are positioned to provide control of the brake and clutch mechanisms and the drive motor in response to the vertical position of the valve stem 20. As shown in FIG. 1, when the valve is closed, the enlarged diameter portion 20e of the stem engages a left-hand limit switch 124 which is effective to de-energize the drive motor and/or control the flow of fluid to or from the clutch or brake mechanisms. As the valve is opened, the larger diameter portion 20e of the stem moves downwardly out of contact with the left-hand limit switch 124, and the fact that both limit switches are out of contact with the stem may be used to effect control of the clutch or brake mechanism or the motor, as desired. Suitable enclosure housing 126 is provided to cover the limit switch arrangement.

The valve 16 can be moved to open and close with respect to the seat ring 14 by vertical translation alone (arrow "A"), or may be opened and closed by rotational action (arrow "B"), in combination with vertical translation. Also, the valve may be retained against vertical translation and rotated in either direction at different speeds during seating. The actuator permits the rotational torque applied to the stem 20 relative to the drive nut 68 to be varied from zero to a maximum value and to be controlled at any selected value therebetween. At the same time, the actuator permits the torque between the stem 20 and the yoke 32 or valve body to be similarly controlled to effect longitudinal translation of the stem simultaneously with or without rotation of the stem and at varying rates from zero to a maximum velocity. Moreover, if desired, by means of the stop pin assembly 90, the valve can be operated to open or close by longitudinal translation of the stem alone, and the valve is also manually operable, as described hereinbefore.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. An actuator mechanism for use in controlling movement of a valve of the type provided with a closure member and a valve body having a valve seat cooperating with said valve closure member, comprising, in combination, an elongated valve stem connected to said valve closure member and having a threaded portion, a differential clutch member mounted on said valve stem for rotation therewith and slidable along the length thereof, a drive nut rotatably mounted in said valve body and in engagement with the threaded portion of said valve stem, power means for rotating said drive nut, a clutch mechanism interconnecting said drive nut and said differential clutch member and operative when energized to cause rotation of said valve stem in response to rotation of said drive nut, and a brake mechanism interconnecting said valve body and said differential clutch member and operative when energized to restrain rotation of said valve stem so that rotation of said drive nut produces movement of said valve stem in the direction of the longitudinal axis thereof 2. The combination of claim 1, wherein said clutch mechanism is air operated, and means are provided for varying the pressure of the air supplied thereto.

3. The combination of claim 2, wherein said variable air supply is connected to said clutch mechanism through said rotating drive nut.

4. The combination of claim 1, wherein said brake is air operated and means are provided for varying the pressure of air supplied thereto.

5. An actuator for controlling the rotation and longitudinal translation of an elongated valve stem relative to a support frame comprising a differential clutch member for rotating said stem and permitting longitudinal translation thereof, rotatable drive nut means threadedly engaging a portion of said stem for driving the same, first frictional clutch means for selectively coupling and uncoupling said drive nut means to said differential clutch member, and second frictional clutch means for selectively coupling and uncoupling said differential clutch means and said support frame.

6. The actuator of claim 5 wherein said first and second clutch means are operable to permit controlled relative rotation between said drive nut means, said differential clutch member and said support frame.

7. The actuator of claim 6 including removable lock pin means for positively restraining rotation of said differential clutch member relative to said support frame.

8. The actuator of claim 6 wherein said first and second clutch means include pressure members disposed on opposite sides of said differential clutch member and means for selectively controlling pressure exerted by said pressure members toward said differential clutch member.

9. The actuator of claim 8 including reversible drive means for rotating said drive nut in opposite directions, said drive means including motor means and at least one high reduction ratio, worm gear combination between said motor means and said drive nut for restraining said nut against rotation relative to said support frame when said stem is rotated manually with respect thereto.

10. The actuator of claim 9 including control means responsive to the longitudinal position of said stem relative to said support frame for controlling said drive means.

* * * * *